United States Patent
Takamatsu et al.

(10) Patent No.: US 11,731,665 B2
(45) Date of Patent: Aug. 22, 2023

(54) DRIVING CONTROL METHOD AND DRIVING CONTROL DEVICE

(71) Applicant: Nissan Motor Co., Ltd., Yokohama (JP)

(72) Inventors: Yoshiro Takamatsu, Kanagawa (JP); Yohei Mishina, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/603,704

(22) PCT Filed: Apr. 12, 2017

(86) PCT No.: PCT/JP2017/015021
§ 371 (c)(1),
(2) Date: Oct. 8, 2019

(87) PCT Pub. No.: WO2018/189843
PCT Pub. Date: Oct. 18, 2018

(65) Prior Publication Data
US 2020/0110422 A1    Apr. 9, 2020

(51) Int. Cl.
*B60W 60/00* (2020.01)
*B60W 50/14* (2020.01)
(Continued)

(52) U.S. Cl.
CPC ........ *B60W 60/0055* (2020.02); *B60W 50/14* (2013.01); *G01C 21/3863* (2020.08);
(Continued)

(58) Field of Classification Search
CPC combination set(s) only.
See application file for complete search history.

(56) References Cited

U.S. PATENT DOCUMENTS 8,504,233 B1    8/2013   Ferguson et al.
9,365,213 B2 *  6/2016   Stenneth ............... B60W 30/00
(Continued)

FOREIGN PATENT DOCUMENTS

JP    H10309960 A       11/1998
JP    2015044432 A  *    3/2015   .......... B60W 30/182
(Continued)

OTHER PUBLICATIONS

SAE International, "Automated Driving Levels of Driving Automation are Defined in New SAE International Standard J3016", Oct. 1, 2014, retrieved from: https://www.sae.org/binaries/content/assets/cm/content/news/press-releases/pathway-to-autonomy/automated_driving.pdf on Aug. 4, 2020 (Year: 2014).*

*Primary Examiner* — Anne Marie Antonucci
*Assistant Examiner* — Amelia Vorce
(74) *Attorney, Agent, or Firm* — Young Basile Hanlon & MacFarlane, P.C.

(57) ABSTRACT

A driving control method comprises: acquiring a destination of a vehicle; referring to a first map that includes identification information of a travel lane and a second map that does not include the identification information of the travel lane; calculating a route from a current position of the vehicle to the destination; when traveling along a first route included in the route and belonging to the first map, setting first driving control, while when traveling along a second route included in the route and belonging to the second map, setting second driving control with a lower level of autonomous driving than that of the first driving control; and creating a driving plan for the vehicle to travel along the route with contents of the set driving control. A driving control apparatus is based on the method.

14 Claims, 8 Drawing Sheets

(51) Int. Cl.
*G01C 21/00* (2006.01)
*B60W 50/00* (2006.01)
*B60W 30/16* (2020.01)

(52) U.S. Cl.
CPC ..... *B60W 30/16* (2013.01); *B60W 2050/0072* (2013.01); *B60W 2552/30* (2020.02); *B60W 2556/40* (2020.02)

(56) References Cited

U.S. PATENT DOCUMENTS

| | | | |
|---|---|---|---|
| 2013/0211656 A1* | 8/2013 | An | G05D 1/0285 701/25 |
| 2014/0018995 A1 | 1/2014 | Ferguson et al. | |
| 2014/0156133 A1 | 6/2014 | Cullinane et al. | |
| 2014/0156134 A1 | 6/2014 | Cullinane et al. | |
| 2014/0330478 A1 | 11/2014 | Cullinane et al. | |
| 2015/0253772 A1* | 9/2015 | Solyom | G05D 1/0276 701/25 |
| 2015/0266472 A1* | 9/2015 | Ferguson | G08G 1/166 701/23 |
| 2015/0284009 A1 | 10/2015 | Cullinane et al. | |
| 2016/0200326 A1 | 7/2016 | Cullinane et al. | |
| 2016/0252904 A1* | 9/2016 | Sakai | B60W 50/14 701/26 |
| 2016/0259334 A1* | 9/2016 | Hashimoto | G05D 1/0061 |
| 2017/0008521 A1* | 1/2017 | Braunstein | G01C 21/36 |
| 2017/0028995 A1* | 2/2017 | Mori | B60Q 9/008 |
| 2017/0043788 A1 | 2/2017 | Cullinane et al. | |
| 2017/0190331 A1* | 7/2017 | Gupta | B60Q 1/346 |
| 2017/0227971 A1 | 8/2017 | Shimotani et al. | |
| 2017/0253253 A1 | 9/2017 | Cullinane et al. | |
| 2017/0259832 A1* | 9/2017 | Lathrop | B60W 50/14 |
| 2017/0284823 A1* | 10/2017 | McNew | B60W 50/08 |
| 2017/0371334 A1* | 12/2017 | Nagy | G05D 1/0061 |
| 2018/0043904 A1 | 2/2018 | Cullinane et al. | |
| 2018/0046186 A1* | 2/2018 | Miller | B60W 10/06 |
| 2018/0067496 A1* | 3/2018 | Prasad | B60W 60/0027 |
| 2018/0099676 A1* | 4/2018 | Goto | G01C 21/3492 |
| 2018/0113474 A1 | 4/2018 | Koda et al. | |
| 2018/0164811 A1* | 6/2018 | Yoo | G05D 1/0088 |
| 2018/0178808 A1* | 6/2018 | Zhao | B60W 50/16 |
| 2018/0194364 A1* | 7/2018 | Asakura | G05D 1/0061 |
| 2018/0239352 A1* | 8/2018 | Wang | B60W 60/0053 |
| 2018/0292833 A1* | 10/2018 | You | G05D 1/0212 |
| 2018/0313655 A1* | 11/2018 | Stephens | G05D 1/0088 |
| 2018/0334173 A1 | 11/2018 | Cullinane et al. | |
| 2019/0054928 A1* | 2/2019 | Hatano | B60W 30/18109 |
| 2019/0291746 A1 | 9/2019 | Cullinane et al. | |
| 2019/0308539 A1* | 10/2019 | Mimura | B60W 50/08 |
| 2019/0382009 A1* | 12/2019 | Iwasa | G08G 1/0969 |
| 2019/0384294 A1* | 12/2019 | Shashua | G05D 1/0088 |
| 2020/0079395 A1* | 3/2020 | Ibuka | B60W 60/0053 |
| 2020/0122722 A1* | 4/2020 | Ishioka | B60W 50/10 |
| 2021/0129857 A1 | 5/2021 | Cullinane et al. | |

FOREIGN PATENT DOCUMENTS

| | | | |
|---|---|---|---|
| JP | 2015-523256 A | 8/2015 | |
| JP | 2015-223933 A | 12/2015 | |
| JP | 2016-504232 A | 2/2016 | |
| JP | 2017-032421 A | 2/2017 | |
| KR | 2017-0027447 A | 3/2017 | |
| WO | 2016/035199 A1 | 3/2016 | |
| WO | 2016/152874 A1 | 9/2016 | |
| WO | WO-2017085981 A1 * | 5/2017 | ............ B60W 40/08 |
| WO | WO-2017141426 A1 * | 8/2017 | ............ B60W 50/14 |

\* cited by examiner

FIG. 2

| | | | FIRST MAP (MP1) | SECOND MAP (MP2) |
|---|---|---|---|---|
| INFORMATION | MAP INFORMATION | | FIRST AREA | SECOND AREA |
| | | BOUNDARY INFORMATION | AVAILABLE | AVAILABLE |
| | | TWO-DIMENSIONAL POSITION INFORMATION | AVAILABLE | UNAVAILABLE |
| | | THREE-DIMENSIONAL POSITION INFORMATION | AVAILABLE | AVAILABLE |
| | | ROAD INFORMATION | AVAILABLE | AVAILABLE |
| | | ROAD ATTRIBUTE INFORMATION | AVAILABLE | AVAILABLE |
| | | UPBOUND/DOWNBOUND INFORMATION | AVAILABLE | UNAVAILABLE |
| | | LANE IDENTIFICATION INFORMATION | AVAILABLE | UNAVAILABLE |
| | | CONNECTION DESTINATION LANE | | |
| DRIVING CONTROL | DRIVING CONTROL LEVEL | | FIRST DRIVING CONTROL | SECOND DRIVING CONTROL |
| | 1 | INTERSECTION DRIVING CONTROL | EXECUTABLE | INEXECUTABLE |
| | 2 | MERGING/BRANCH DRIVING CONTROL | EXECUTABLE | INEXECUTABLE |
| | 3 | LANE CHANGE DRIVING CONTROL | EXECUTABLE | INEXECUTABLE |
| | 4 | LANE-KEEPING DRIVING CONTROL | EXECUTABLE | EXECUTABLE |
| | 5 | ASSIST CONTROL FOR DRIVING BY DRIVER | EXECUTABLE | EXECUTABLE |

DRIVING CONTROL METHOD AND DRIVING CONTROL DEVICE

TECHNICAL FIELD

The present invention relates to a driving control method and a driving control apparatus.

BACKGROUND

A method is known in which when a determination is made that lane information has become unavailable or unreliable, the distance from a neighboring vehicle is monitored using a sensor and the distance is maintained to be less than a predetermined value (Japanese Translation of PCT International Application, No. 2015-523256).

SUMMARY

The above prior art, however, has a problem in that the autonomous/automated driving may not be continued depending on the situation because the distance from another vehicle is controlled when a determination is made that the accuracy of map information including lanes is low.

A problem to be solved by the present invention is to achieve continuation of autonomous driving even when traveling in an area in which the accuracy of map information is low.

The present invention solves the above problem by lowering the control level of autonomous driving when traveling in an area in which the accuracy of map information is low.

According to the present invention, the autonomous/automated driving can be continued even when traveling in an area in which the accuracy of map information is low.

BRIEF DESCRIPTION OF THE DRAWINGS

FIG. 2 is a diagram for describing an example of map information according to one or more embodiments of the present invention;

FIG. 3 is a diagram illustrating a form of the map information according to one or more embodiments of the present invention;

DETAILED DESCRIPTION

Hereinafter, one or more embodiments of the present invention will be described with reference to the drawings. In the embodiments, the present invention will be described by exemplifying a case in which the driving control apparatus for a vehicle according to the present invention is applied to a driving control system equipped in a vehicle. Embodiments of the driving control apparatus according to the present invention are not limited and can also be applied to a portable terminal device that can exchange information with the vehicle side. The driving control apparatus, the driving control system, and the portable terminal device are each a computer that executes calculation processes.

Figure 1:
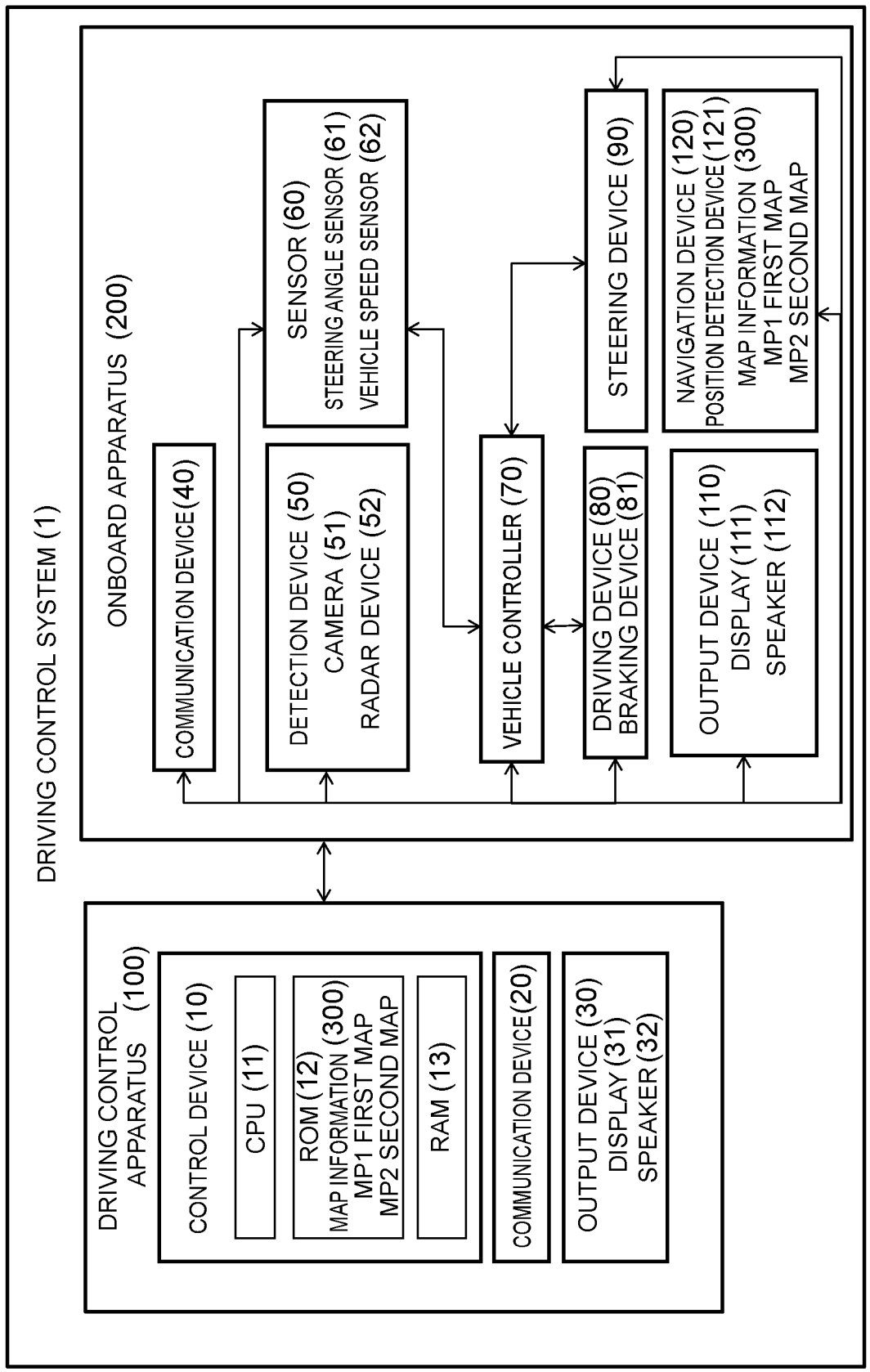
FIG. 1 is a block configuration diagram of a driving control system according to one or more embodiments of the present invention.

FIG. 1 is a diagram illustrating the block configuration of a driving control system 1 according to one or more embodiments of the present invention. The driving control system 1 includes a driving control apparatus 100 and an onboard apparatus 200. The driving control apparatus 100 and onboard apparatus 200 according to one or more embodiments of the present invention have communication devices 20 and 40, respectively, and exchange information with each other via wired or wireless communication.

The onboard apparatus 200 will first be described.

The onboard apparatus 200 according to one or more embodiments of the present invention includes a detection device 50, a sensor 60, a vehicle controller 70, a driving device 80, a steering device 90, an output device 110, and a navigation device 120. These devices which constitute the onboard apparatus 200 are connected to one another via a controller area network (CAN) or other onboard LAN to mutually exchange information.

These devices which constitute the onboard apparatus 200 will be described below.

The detection device 50 detects the existence of an object such as another vehicle and its existence position. The detection device 50 according to one or more embodiments of the present invention includes, but is not limited to including, a camera 51. The camera 51 according to one or more embodiments of the present invention is, for example, a camera that includes an imaging element such as a CCD. The camera 51 according to one or more embodiments of the present invention, which is installed in the subject vehicle, captures images around the subject vehicle and acquires image data that includes an object vehicle existing around the subject vehicle.

The camera 51 according to one or more embodiments of the present invention is attached to the rear part of the subject vehicle at the position of a height h so that the optical axis has an angle θ downward from the horizontal direction. The camera 51 captures images of a certain area behind the subject vehicle V1 from that position at a predetermined view angle Q. The view angle Q of the camera 51 is set to an angle that allows imaging not only of the travel lane in which the subject vehicle travels but also of the right and left travel lanes. The images captured by the camera 51 include those captured behind the subject vehicle.

The detection device 50 processes the acquired image data to calculate the position of an object with respect to the subject vehicle or the distance from the object to the subject vehicle. The detection device 50 calculates the relative speed and relative acceleration between the subject vehicle and the object from a variation over time of the position of the object. As for a process of calculating the positional relationship between the subject vehicle and another vehicle based on the image data and a process of calculating the speed information based on the amount of variation over time of the positional relationship, any method known at the time of filing of the present application can be appropriately used.

In addition or alternatively, the detection device 50 according to one or more embodiments of the present invention may include a radar device 52. Examples of the radar device 52 may be those, such as millimeter-wave radar, laser radar, and ultrasonic radar, which are known at the time of filing of the present application.

The sensor 60 according to one or more embodiments of the present invention includes a steering angle sensor 61 and a vehicle speed sensor 62. The steering angle sensor 61 detects steering information, such as the steering amount, steering speed, and steering acceleration of the subject vehicle, and sends the steering information to the vehicle controller 70 and the driving control apparatus 100. The vehicle speed sensor 62 detects the vehicle speed and acceleration of the subject vehicle and sends them to the vehicle controller 70 and the driving control apparatus 100.

The vehicle controller 70 according to one or more embodiments of the present invention is an onboard computer, such as an electric control unit (ECU), and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both an electric motor and an internal combustion engine as the traveling drive sources. Examples of the electric car and hybrid car having an electric motor as the traveling drive source include a type in which the power source for the electric motor is a secondary battery and a type in which the power source for the electric motor is a fuel cell.

The driving device 80 according to one or more embodiments of the present invention includes a drive mechanism of the subject vehicle. The drive mechanism includes an electric motor and/or an internal-combustion engine as the above-described traveling drive sources, a power transmission device including a drive shaft and an automatic transmission that transmit the output of the traveling drive sources to the drive wheels, and a braking device that brakes the wheels. The driving device 80 generates respective control signals for these components of the drive mechanism and executes the driving control including acceleration and deceleration of the vehicle. These control signals for the drive mechanism are generated on the basis of input signals by an accelerator operation and a brake operation of the driver and control signals acquired from the vehicle controller 70 or from the driving control apparatus 100. Control information may be sent to the driving device 80, which can thereby perform the driving control including acceleration and deceleration of the vehicle in an automated or autonomous manner. In the case of a hybrid car, the driving device 80 may receive a ratio of the torque output to the electric motor and the torque output to the internal-combustion engine in accordance with the traveling state of the vehicle.

Acquiring the control information from a control device 10, the vehicle controller 70 controls the driving device 80 and the steering device 90 so that the subject vehicle V1 travels along a target route. The vehicle controller 70 controls the steering device 90 using the road shape detected by the detection device 50, the road information from the navigation device 120, and a lane mark model stored in map information 300 so that the subject vehicle travels while keeping a certain lateral position with respect to the travel lane. The steering device 90 according to one or more embodiments of the present invention includes a steering actuator. The steering actuator includes a motor and other necessary components attached to the steering column shaft. The steering device 90 executes the steering control for the vehicle on the basis of a control signal acquired from the vehicle controller 70 or an input signal by the steering operation of the driver. The vehicle controller 70 calculates a steering control amount on the basis of information on the steering angle acquired from the steering angle sensor 61, the vehicle speed acquired from the vehicle speed sensor 62, and a steering actuator current and sends a current command to the steering actuator thereby to perform control such that the subject vehicle travels at a target lateral position. The method of controlling the lateral position of the subject vehicle V1 is not limited to using the above-described steering device 90. In addition or alternatively, the driving device 80 and/or a braking device 81 may be used to control the traveling direction (i.e. the lateral position) of the subject vehicle V1 on the basis of the rotational speed difference between the right and left drive wheels. In this sense, the "steering" of a vehicle is intended to encompass the cases of using the driving device 80 and/or the braking device 81 in addition to the cases of using the steering device 90.

The navigation device 120 according to one or more embodiments of the present invention calculates a route from the current position of the subject vehicle to a destination and outputs route guidance information via the output device 110, which will be described later. The navigation device 120 includes a position detection device 121 and map information 300 that is readable. The position detection device 121 is responsible to the global positioning system (GPS) and detects the position (latitude/longitude) at which the vehicle is traveling. The navigation device 120 refers to the map information 300 to specify a road link on which the subject vehicle travels, on the basis of the current position of the subject vehicle detected by the position detection device 121.

The map information 300 of the navigation device 120 is in common with map information 300 possessed by the driving control apparatus 100, which will be described later. The map information 300 may be provided in the navigation device 120 and may also be provided in the driving control apparatus 100. The map information 300 will be described later.

The driving control apparatus 100 according to one or more embodiments of the present invention will be described below.

As illustrated in FIG. 1, the driving control apparatus 100 according to one or more embodiments of the present invention includes a control device 10, a communication device 20, and an output device 30. The communication device 20 exchanges information with the onboard apparatus 200.

The driving control apparatus 100 executes control to assist the driver's driving operation. The control device 10 assists the driver's steering operation. The control device 10 calculates the movement amount and/or movement speed in the lateral direction (vehicle width direction) on the basis of the route and assists control of the steering device 90 on the basis of the steering angle corresponding to the movement amount. The control device 10 also assists the driver's accelerator operation and brake operation. The control device 10 calculates the movement amount and/or movement speed in the longitudinal direction (vehicle length direction) and assists control of the driving device 80 and/or braking device 81 in accordance with the movement amount and/or the movement speed.

The control device 10 of the driving control apparatus 100 is a computer including a read only memory (ROM) 12 that stores programs for executing the driving control of the subject vehicle, a central processing unit (CPU) 11 as an operation circuit that executes the programs stored in the ROM 12 to serve as the driving control apparatus 100, and a random access memory (RAM) 13 that serves as an accessible storage device. The control device 10 according to one or more embodiments of the present invention executes each function by cooperation of software for realizing the above functions and the above-described hardware.

The control device 10 of the driving control apparatus 100 includes map information 300.

The map information 300 according to one or more embodiments of the present invention will be described.

The map information 300 includes a first map MP1 and a second map MP2. The first map MP1 is a map with higher accuracy than that of the second map MP2. The first map MP1 includes identification information of the travel lane, and the second map MP2 does not include identification information of the travel lane.

FIG. 2 lists the contents of information of the first map MP1 and second map MP2 and the contents of driving control that can be achieved when using the contents of information. The first map MP1 includes boundary information that indicates an area of the first map MP1. Using this boundary information, a determination can be made as to whether or not the current position or each point on the route belongs to the area of the first map MP1. If the boundary between a first area and a second area is not clearly defined, the boundary may be defined by the road types of arterial roads and urban roads. In an embodiment, arterial roads can be defined in the first area while other urban roads can be defined in the second area. This is because it is highly possible that the first map MP1 has been created for arterial roads. In a structure of the map information 300, the first map MP1 includes geographical information that contains roads belonging to the first area while the second map MP2 includes geographical information that contains roads belonging to the entire area including the first area and the second area. When the first map MP1 exists for the first area, the map information of the area of the second map MP2 corresponding to the first area is not used, and only the map information of the second area other than the first area is used. When the second map MP2 exists for the first area, it is possible to use the second map MP2 of the first area.

The first map MP1 has two-dimensional information and three-dimensional information. The first map MP1 has road information, road attribute information, and upbound/downbound information of roads. The first map MP1 has identification information for specifying each single lane and connection destination lane information for identifying a lane to which each lane is connected. The identification information for identifying a lane enables the control device 10 to predict a lane to travel in the future.

Driving control is based on processes of recognition, determination, and operation. The recognition process may use not only the map information but also the detection information from a camera, a radar sensor, an attitude sensor, or other similar sensor, but the accuracy of the map information affects the accuracy of the recognition process.

To perform high-level automated or autonomous driving such that a vehicle travels along a route in an automated or autonomous manner without requiring human operation, accurate recognition of a travel lane for the vehicle to travel in the future is required. To accurately perform forward prediction (recognition) that enables the autonomous/automated driving, highly accurate digital map information (highly accurate map, dynamic map) is required. In other words, to execute the autonomous driving at a high level, the first map MP1 is required with which at least a lane can be identified.

The term "autonomous (automated or autonomous) driving" has a broad meaning. The "autonomous driving" refers to various levels from a level of the autonomous driving in which the driver is temporarily relieved from the steering operation to a level of the autonomous driving in which the vehicle moves to the destination in an autonomous manner even when the driver or a passenger does not perform the driving operation at all (fully autonomous driving). In the present description, the driving control in which the driver is temporarily relieved from the steering operation or the driver is relieved from the steering operation in a certain traveling area is defined as a low level of the autonomous driving, and the driving control in which the vehicle moves to the destination in an autonomous manner even when the driver or a passenger does not perform the driving operation at all is defined as the highest level of the autonomous driving. The fewer the operations required of the driver or a passenger, a determination is made that the level of the autonomous driving is higher.

The contents of the driving control and the autonomous driving levels are listed in FIG. 2. Examples of the driving control with a high level of the autonomous driving include 1) intersection driving control, 2) merging/branch driving control, and 3) lane change driving control. Such driving control with a high level of the autonomous driving (necessity of human determination is low) requires a high level of recognition. Accordingly, such driving control requires the first map MP1 which is highly accurate map information.

FIG. 2 further lists 4) lane-keeping driving control as the driving control with a low level of the autonomous driving. The lane-keeping driving control is to control the lateral position of the vehicle so as not to deviate from the currently traveling lane. This driving control does not require such a level of recognition as to accurately estimate the forward situation for the vehicle to travel in the future. This driving control can therefore be executed using the second map MP2 without requiring the first map MP1 which is highly accurate map information. Control of 5) for performing an assist on driving by the driver is to assist the driver's operation and is on the assumption of the driver's operation. It can be positioned as the driving control with the lowest level of the autonomous driving.

The first driving control performed using the first map MP1 includes the lane change driving control by the autonomous driving which uses a lane prediction result in the traveling direction of the vehicle, while the second driving control does not include the lane change driving control. The first map MP1 and the contents of the first driving control are associated with each other and the second map MP2 and the contents of the second driving control are associated with each other; therefore, the driving control can be carried out with different levels of the autonomous driving in accordance with the change of the map to be referred to. The first driving control may include the lane change driving control, the merging/branch driving control, and the driving control for passing through an intersection. More generally, the first driving control may include any one or more of the lane change driving control, the merging/branch driving control, and the driving control for passing through an intersection. The second driving control can include driving control for traveling at a constant speed, driving control for keeping an inter-vehicle distance, driving control for following a preceding vehicle, and other similar driving control. As will be understood, these can also be executed as the first driving control.

In the autonomous driving, the control device 10 estimates the position of the vehicle using the first map MP1 which is a highly accurate map including at least the identification information for each lane, determines the travel lane for the vehicle and the future travel lane for the vehicle, determines the situation of obstacles and travel paths in the travel lane, and controls the lateral position of the vehicle (steering/steering amount/steering speed) and the longitudinal position of the vehicle (operation/operation amount/operation speed of accelerator/brake) in accordance with the situation thereby to execute the autonomous driving.

To perform the driving control for moving from the currently traveling lane to an adjacent lane or turning to the right or left from the currently traveling lane, it may be necessary to predict the lane for the subject vehicle to travel in the future and recognize the connection relationship between lanes. By using the first map MP1 including the information for identifying each lane, it is possible to accurately predict the lane for the subject vehicle to travel in the future. To drive along a route to the destination in an autonomous manner, that is, to perform lane change, passage through an intersection, and/or passage through a merging/branching point for heading to the destination by the autonomous driving, the lane for the subject vehicle to travel in the future has to be identified. In order for the control device 10 to execute the driving plan by the autonomous driving, it may be necessary to accurately recognize the lane to travel in the future, which requires the first map MP1 including identification information of each lane.

On the other hand, the lane-keeping (lane departure prevention) driving control is executable as long as the lane in which the subject vehicle is currently traveling or has been traveling immediately before can be identified, such as using captured images. To perform the lane-keeping driving control, it may be enough to identify a road including a plurality of lanes. The lane-keeping driving control can be executed using the second map MP2 which does not include the identification information of each lane. As listed in FIG. 2, the second map MP2 does not include the lane identification information and the connection destination information for each lane. The second map MP2 also does not include the three-dimensional positional information.

The lane-keeping driving control includes recognizing the travel lane, in which the vehicle is traveling, and controlling the movement of the vehicle so as to keep a certain relationship between the position of a lane mark of the travel lane and the position of the subject vehicle. The lane mark may be a line drawn on a road surface and may also be a road structure existing on the side of a road shoulder of a lane, such as a guardrail, a curbstone, a sidewalk or an exclusive road for two wheels, or a structure, such as a traffic sign, a store or a roadside tree.

To carry out the autonomous driving, a highly accurate map including at least the lane identification information is needed, but it requires immeasurable costs and efforts to create a highly accurate map in which the lane identification information is provided for all areas. It may not be realistic that highly accurate maps are created for all regions in the country and in the world. When the autonomous driving control is explained, it is assumed that highly accurate maps of all regions exist experimentally or virtually, but the map information actually used may have to involve maps in which highly accurate maps and roughly accurate maps are mixed. In an embodiment, highly accurate maps can be employed only for heavily-trafficked areas, areas in which the autonomous driving is carried out, and arterial roads. The map information according to one or more embodiments of the present invention may be presented by one map that includes the first map MP1 and the second map MP2 in different areas or may also include the first map MP1 and the second map MP2 as respective map data. The second map data MP2 may include a map (roughly accurate map) of the entire area including the first area and the second area.

FIG. 3 illustrates an example of the map information 300. The map information 300 illustrated in FIG. 3 includes a first map MP1 of a first area and a second map MP2 of a second area other than the first area. The first map MP1 of the map information 300 is a highly accurate map of the first area which includes arterial roads and is surrounded by arterial roads.

The map information 300 includes road information. The road information includes, for each link, attributes such as a road type, a road width, a road shape, and whether or not the overtaking is permitted (whether or not the lane change to an adjacent lane is permitted). The attribute of each lane is stored for each link as an item of the road information of the first map MP1. The road information can be used to identify a lane with an attribute of traveling at a relatively low speed and a lane (overtaking lane) with an attribute of traveling at a relatively high speed. The road information of the first map MP1 includes the relative position of each lane. The road information includes, for each lane, an attribute such as being the rightmost lane of a road, being the leftmost lane of a road, being the n-th lane, or being a lane for which another lane exists on the right or left.

As described above, there are executable driving control and inexecutable driving control depending on the accuracy of the map information 300. As an example, FIG. 2 lists the executable driving control with the first map MP1 and the executable driving control with the second map MP2. When using the first map MP1, the executable driving control includes the intersection driving control and the merging/branch driving control which are considered to have the highest technical difficulty and the lane change driving control which is the basis of the intersection driving control and the merging/branch driving control. When using the second map MP2, these three forms of driving control are difficult to carry out. As will be understood, the control device 10 is required to have the ability to execute the driving control using the first map MP1.

The lane-keeping driving control, which is technically easy (i.e., the autonomous driving level is low), can be executed using any of the first map MP1 and the second map MP2. Likewise, regardless of which of the first map MP1 and the second map MP2 is used, the mode for assisting the driving based on the driver's intention (in which the driver determines the driving operation and the operation is assisted) can be executed.

Processes executed by the control device 10 will then be described.

The control device 10 acquires a destination of the vehicle. The destination may be specified by the input made by the driver or a passenger or may also be designated by the driving control apparatus 100 on the basis of the past history.

The control device 10 refers to the first map MP1 and/or the second map MP2 to calculate a route from the current position of the vehicle to the destination. Any route search method known at the time of filing of the present application may be used for calculation of the route.

The calculated route includes a first route belonging to the first map MP1 and a second route belonging to the second map MP2. When traveling along the first route included in the route and belonging to the first map MP1, the control device 10 sets the first driving control, while when traveling along the second route included in the route and belonging to the second map MP2, the control device 10 sets the second driving control with a lower level of the autonomous driving than that of the first driving control. The control device 10 then creates a driving plan for the vehicle to travel to the destination with the contents of the set driving control.

When using the first map MP1, the driving control can be executed, including the lane change driving with a high level of the autonomous driving, but when using the second map MP2, the lane change driving cannot be executed. If no action takes place, the autonomous driving will be stopped just at the moment of entering the second area even though the autonomous driving has been executed in the first route within the first area. When entering the second area from the first area, the control device 10 lowers the autonomous driving level of the driving control to continue the driving control. For example, the vehicle is controlled to travel along the first route within the first area on the basis of any of the lane change driving control, the merging/branch driving control, and the driving control for passing through an intersection, which are included in the autonomous driving, and controlled to travel along the second route within the second area on the basis of the driving control which does not include the lane change driving control. Specifically, the vehicle is controlled to travel along the first route within the first area by the autonomous driving which includes a lane change, and controlled to travel along the second route within the second area by the lane-keeping driving control. Thus, the driving control to be switched can be preliminarily defined thereby to prevent the driving control from suddenly stopping. The autonomous driving level may be lowered, but the driving control is continued, so that the burden on the driver and passengers can be alleviated.

In the route calculation process, the route may be calculated so as to achieve a predetermined relationship between a first travel cost for the first route belonging to the first map MP1 and a second travel cost for the second route belonging to the second map MP2. That is, the predetermined relationship is defined as to whether to employ a route for preferentially passing through the first route belonging to the first map MP1 or a route for preferentially passing through the second route belonging to the second map MP2, and the route is calculated based on the definition. This allows the driving plan to be created so as to arbitrarily set the ratio of the first route along which the high-level autonomous driving can be carried out, and the autonomous driving can be utilized in accordance with the environment and the situation. When it is desired to relatively prioritize the travel by the autonomous driving, the ratio of the first travel cost to the second travel cost may be set high. In contrast, when it is desired to utilize only the lane-keeping function without performing a lane change or the like, the ratio of the first travel cost to the second travel cost may be set low.

Figure 4:
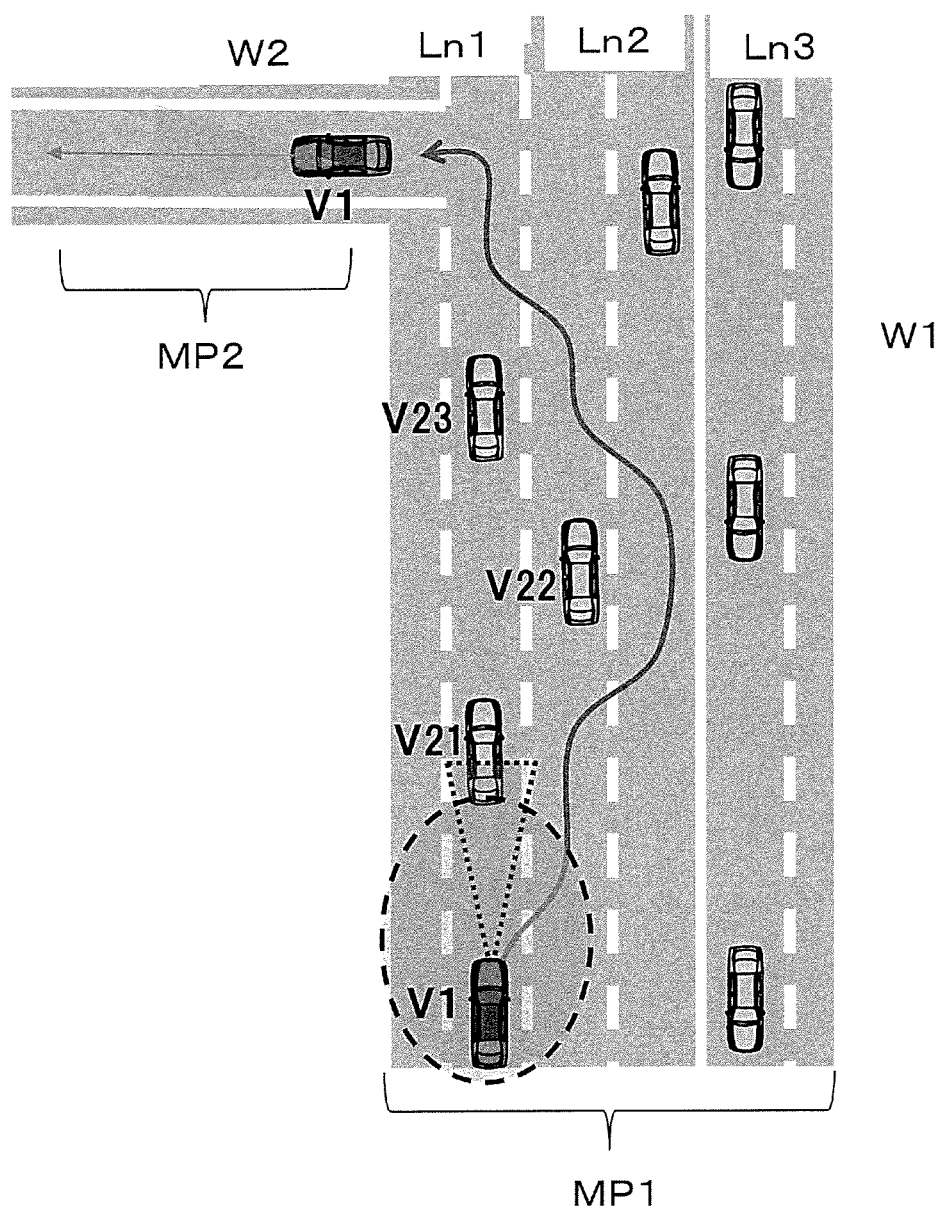
FIG. 4 is a diagram for describing high-level driving control according to one or more embodiments of the present invention.

FIG. 4 illustrates a scene in which the lane change driving control with a high level of the autonomous driving is being executed. As illustrated in FIG. 4, the central road W1 with three lanes Ln1, Ln2 and Ln3 is an arterial road and is included in the first map MP1. The single-lane road W2 connected to the left side of the arterial road is a narrow urban road and is included in the second map MP2. The route to the destination of the vehicle V1 is a route from the road W1 to the road W2. The sensor 60 of the subject vehicle V1 detects other vehicles V21, V22 and V23 as obstacles and the lane change driving is performed to avoid the other vehicles so that the subject vehicle V1 moves rightward from the currently traveling lane Ln1 toward the lane Ln3 via the lane Ln2 and then returns from the lane Ln3 to the lane Ln1 via the lane Ln2. Such driving control requires a high level of recognition to predict the future travel lane, and information on the highly accurate map is essential for the driving control. The vehicle V1 then turns left to the road W2. The road W2 is included in the second map MP2 (the first map MP1 information is not created). The high-level autonomous driving control cannot be carried out on the road W2. Rather than immediately stopping the autonomous driving control, the control device 10 switches from the autonomous driving control (first driving control), which includes the lane change driving, to the lane-keeping driving control (second driving control) which is executable using the second map MP2. During this operation, operation assistance for the accelerator/brake may be performed as the driving control for maintaining the constant speed traveling and the inter-vehicle distance. The driving control is continued by switching to the second driving control, rather than immediately stopping the first driving control because the road W2 does not belong to the first map MP1.

The second driving control may include assists on the driving operation performed by the driver. The assists on driving by the driver include an assist on the steering operation, an assist on the accelerator operation, and an assist on the brake operation. The control device 10 assists control of the lateral position and/or longitudinal position of the vehicle. In a scene in which the first driving control cannot be performed, the second driving control is performed. During this operation, the driver's load can be reduced because the driving operation by the driver is assisted. From the viewpoint of continuing the driving, the second driving control can also include stopping the autonomous driving control and performing the driving control based on the steering operation and braking operation by the driver.

The control device 10 may use the output devices 30 and 110 to present the driving plan to the driver and passengers of the vehicle before starting execution of the driving plan. The driving plan includes a control change point at which the first driving control and the second driving control are switched. This allows the driver and passengers to confirm the switching point of the autonomous driving control in the driving plan before starting the driving. Thus, the driver and passengers preliminarily confirm the point at which the initiative of driving is assigned, and the driving plan can thereby be smoothly executed.

The control device 10 may present a control change point to the driver and passengers of the vehicle when passing through a point before the control change point by a predetermined distance. The control change point is a point at which the first driving control and the second driving control are switched. This allows the driver and passengers to confirm the switching point of the autonomous driving control in the driving plan before the switching point. Thus, the driving plan can be smoothly executed because the confirmation can be made on the upstream side of the point at which the initiative of driving is assigned (the subject determining the driving control changes).

To switch between the first driving control and the second driving control, the control device 10 may execute preparation of switching of the driving control on the upstream side of the switching point.

Specifically, the control device 10 may create the driving plan on the upstream side of the control change point at which the first driving control and the second driving control are switched. The driving plan includes the driving control to move the vehicle to a centerline-side lane on the upstream side of the control change point at which the first driving control and the second driving control are switched. The centerline-side lane refers to a lane on the centerline side, that is, a lane on the oncoming lane side. In a road including a plurality of lanes, it is highly possible that merging/branch into/from another lane takes place on the right or left end side (opposite side to the centerline side) of a road. It is not preferred to switch the driving control in a lane in which change in the traffic flow is likely to occur. The centerline-side lane may often be designated as an overtaking lane or a high-speed lane, in which disturbance in the traffic flow is small. In such a lane, the inter-vehicle distance tends to be set longer and, therefore, the influence due to switching of the driving control is also small. On the other hand, in a lane on the right or left end side, a number of vehicles are traveling toward a branch or turning to the right or left and some vehicles may be parked on the road shoulder, so that the traveling speed may be low and the inter-vehicle distance tends to be short. The influence due to switching of the driving control may therefore be large. Accordingly, in preparation for switching of the driving control, the control device 10 controls the vehicle to preliminarily move to the centerline-side lane, in which change in the traffic flow is less likely to occur, on the upstream side of the driving control switching point. This can suppress the influence on the vehicle due to switching of the driving control.

The control device 10 may create the driving plan including the driving control to move the vehicle to the central area of a lane when traveling through the control change point at which the first driving control and the second driving control are switched. By moving the vehicle to the center of the lane before switching the driving control, it is possible to readily respond to any change in the behavior of the vehicle. This can suppress the influence on the vehicle due to switching of the driving control and prepare for the behavior change.

The control device 10 may create the driving plan including the driving control to set a speed of the vehicle to a target value when traveling through the control change point at which the first driving control and the second driving control are switched. When switching the driving control, it is preferred that the acceleration and deceleration do not affect the traffic flow. It is also preferred to set a target value on the basis of the speed for the lane, in which the vehicle travels when switching the driving control, and to set the speed of the vehicle to the target value. The target value may be set on the basis of the average speed, speed limit, or actually measured speed for the travel lane. The speed (average speed, speed limit, or actually measured speed) for the travel lane can be acquired from the map information 300 by at least temporarily storing the speed in association with the road information of the map information 300. The speed may also be acquired from the intelligent transport systems (ITS). This can suppress the behavior change of the vehicle due to switching of the driving control and prevent the influence on the driving of another vehicle.

The control device 10 may create the driving plan including the driving control to make an amount of change in the behavior of the vehicle less than a predetermined value when traveling through the control change point at which the first driving control and the second driving control are switched. When switching between the first driving control and the second driving control, the vehicle behavior changes to some extent, but even if a change occurs in the vehicle behavior, the change in the behavior of the vehicle is made smooth. This can make moderate the change in the vehicle behavior due to switching of the driving control and prevent the influence on the driving of another vehicle.

The control device 10 may create the driving plan including the driving control to lower a control gain of the vehicle when traveling through the control change point at which the first driving control and the second driving control are switched. When the driving control is switched, the control gain is lowered to allow the driver's intervention in the operation to be readily accepted, so that even when the driver suddenly steers the steering wheel, the driver's operation command can be executed without conflicting with the driving control which is being executed (without being refused).

The control device 10 may create the driving plan such that switching between the first driving control and the second driving control is executed in a lane having a curvature less than a predetermined curvature. By performing the switching of the driving control in an area (route) in which lateral acceleration and lateral jerk are less likely to occur, it is possible to suppress the change in the vehicle behavior due to switching of the driving control.

The control device 10 may create the driving plan such that switching between the first driving control and the second driving control is executed in a lane in which the number of vehicles present within a predetermined distance is less than a predetermined value. When the number of vehicles present within a predetermined distance is large, it is highly possible that other vehicles are present in the vicinity. In this case, it may be necessary to create the driving plan for the vehicle with consideration for the movement of other vehicles in the vicinity, and calculation of the driving plan will be complicated. By executing the switching of the driving control in a lane in which the number of other vehicles is small, it is possible to execute the control which gives priority to the movement of the subject vehicle with consideration only for the behavior of the subject vehicle.

The control procedure of the driving control apparatus 100 according to one or more embodiments of the present invention will then be described with reference to FIG. 5. The contents of the process in each step are as described above and the flow of the process will be mainly described below.

In step S101, the control device 10 acquires subject vehicle information that includes the current position of the subject vehicle V1. The subject vehicle information may further include the vehicle speed/acceleration of the subject vehicle V1. In step S102, the control device 10 reads the map information 300 of an area that includes the current position. The map information 300 includes the first map MP1 and the second map MP2.

In step S103, the control device 10 calculates a route from the current position to the destination. For the first route belonging to the first map MP1 and the second route belonging to the second map MP2, the control device 10 creates the driving plan in which the driving control is switched in accordance with the accuracy of the map. When traveling along the first route included in the route and belonging to the first map MP1, the first driving control is set, while when traveling along the second route included in the route and belonging to the second map MP2, the second driving control having a lower level of the autonomous driving than that of the first driving control is set. The first driving control has a higher degree of the autonomous driving level than that of the second driving control, that is, a higher degree of not requiring human operation than that of the second driving control. Specifically, the first driving control includes any one or more of the lane change driving control, the merging/branch driving control, and the intersection driving control by the autonomous driving using a lane prediction result in the traveling direction of the vehicle, while the second driving control does not include the lane change driving control, the merging/branch driving control, and the intersection driving control. When transitioning from the first route to the second route, the control device 10 switches the driving control from the first driving control to the second driving control having a lower level of the autonomous driving.

The driving plan includes control contents as preparation before switching to the second driving control. The control device 10 makes the preparation on the upstream side of the control switching point. Examples of the preparation include moving the vehicle to the centerline-side lane (lane on the opposite side to the right or left end), moving the vehicle to the center of a lane, setting the speed to a target value corresponding to the traveling speed for the lane, moving the vehicle to a lane having a curvature less than a predetermined curvature, and setting the control switching point to a point corresponding to the timing when the density of vehicles is low. This can suppress the change in behavior of the vehicle when switching the driving control and prevent interference with smooth driving of other vehicles.

The driving plan may also include control contents when switching to the second driving control. At the control switching point, the control device 10 may make an amount of change in the behavior of the vehicle less than a predetermined value and/or lower the control gain of the vehicle.

The created driving plan may be presented to the driver and passengers before the driving plan is executed. The driving plan including the driving control at the control change point at which the driving control is changed may be presented to the driver and passengers before the control change point.

The control device 10 may control the output devices 30 and/or 110 to present the calculated route. Display examples are illustrated in FIGS. 3 and 4. In order for the driver and passengers to easily identify the first route and the second route, the routes may be displayed with different forms (such as color, thickness, and broken lines). In addition or alternatively, in order for the driver and passengers to easily recognize the point of entering the first area and the point of exiting the first area, the connection points may be displayed in an emphasized manner. The point of entering the first area and the point of exiting the first area correspond to points at which the driving control is switched.

In step S104, the control device 10 acquires the detection result of an object from the detection device 50. The detection result of an object includes information on the position of another vehicle. The control device 10 recognizes an object such as another vehicle as an obstacle which the vehicle should avoid.

In step S105, the control device 10 calculates target positions that are used as references for the driving control for the vehicle. Each target position includes a target lateral position (target X-coordinate) and a target longitudinal position (target Y-coordinate). The target positions are those at which the vehicle is avoided from coming close to/coming into contact with an obstacle. The target route is obtained by connecting the calculated one or more target coordinates and the current position of the vehicle V1.

In step S106, the control device 10 compares the current lateral position of the subject vehicle V1 with the target lateral position acquired in step S105 and calculates a feedback gain for the lateral position on the basis of the comparison result.

In step S107, the control device 10 calculates a target control value on the basis of the actual lateral position of the subject vehicle V1, the target lateral position corresponding to the current position, and the feedback gain of step S106. The target control value relates to a steering angle, a steering angular speed, and other parameters necessary for moving the subject vehicle V1 on the target lateral position. In step S112, the control device 10 outputs the target control value to the onboard apparatus 200. This allows the subject vehicle V1 to travel on the target route which is defined by the target lateral position.

In step S109, the control device 10 calculates the target longitudinal position along the route. In step S110, the control device 10 compares the current longitudinal position and the vehicle speed and acceleration at the current position of the subject vehicle V1 with the target longitudinal position corresponding to the current longitudinal position and the vehicle speed and acceleration at the target longitudinal position and calculates a feedback gain for the longitudinal position on the basis of the comparison results. Then, in step S111, the control device 10 calculates a target control value for the longitudinal position on the basis of the vehicle speed and acceleration corresponding to the target longitudinal position and the feedback gain for the longitudinal position calculated in step S110.

Here, the target control value in the longitudinal direction refers to a control value for each of the operation of drive mechanism (which includes the operation of an internal-combustion engine in the case of an engine car and the operation of an electric motor in the case of an electric car and may further include the torque distribution for an internal-combustion engine and electric motor in the case of a hybrid car) and the braking operation to achieve the acceleration, deceleration, and vehicle speed corresponding to the target longitudinal position. For example, in an engine car, the control function serves to calculate a target amount of intake air (target opening degree of the throttle valve) and a target amount of fuel injection on the basis of values of the current and target acceleration, deceleration, and vehicle speed and send them to the driving device 80. Alternatively, the control function may serve to calculate the acceleration, deceleration, and vehicle speed and send them to the vehicle controller 70, which may calculate a control value for each of the operation of drive mechanism (which includes the operation of an internal-combustion engine in the case of an engine car and the operation of an electric motor in the case of an electric car and may further include the torque distribution for an internal-combustion engine and electric motor in the case of a hybrid car) and the braking operation to achieve these acceleration, deceleration, and vehicle speed.

In step S112, the control device 10 outputs the target control value in the longitudinal direction calculated in step S111 to the onboard apparatus 200. The vehicle controller 70 executes the steering control and driving control to operate the subject vehicle to travel on the target route which is defined by the target lateral position and target longitudinal position. As in the previously described steps S105 to S107 and S112, the processes of steps S109 to S112 are repeated every time the target longitudinal position is acquired, and the control value for each target longitudinal position acquired is output to the onboard apparatus 200.

In step S113, the vehicle controller 70 executes the driving control in accordance with the command from the control device 10.

In step S114, the control device 10 determines whether the driver intervenes in the operation, such as whether the driver performs the steering operation. When the operation by the driver is not detected, the process returns to step S101, from which the setting of a new object area, calculation of a target route, and driving control are repeated. On the other hand, when the operation by the driver is detected, the process proceeds to step S115, in which the driving control is suspended. When the driving control is suspended, the driver and passengers are informed of this fact.

Figure 5:
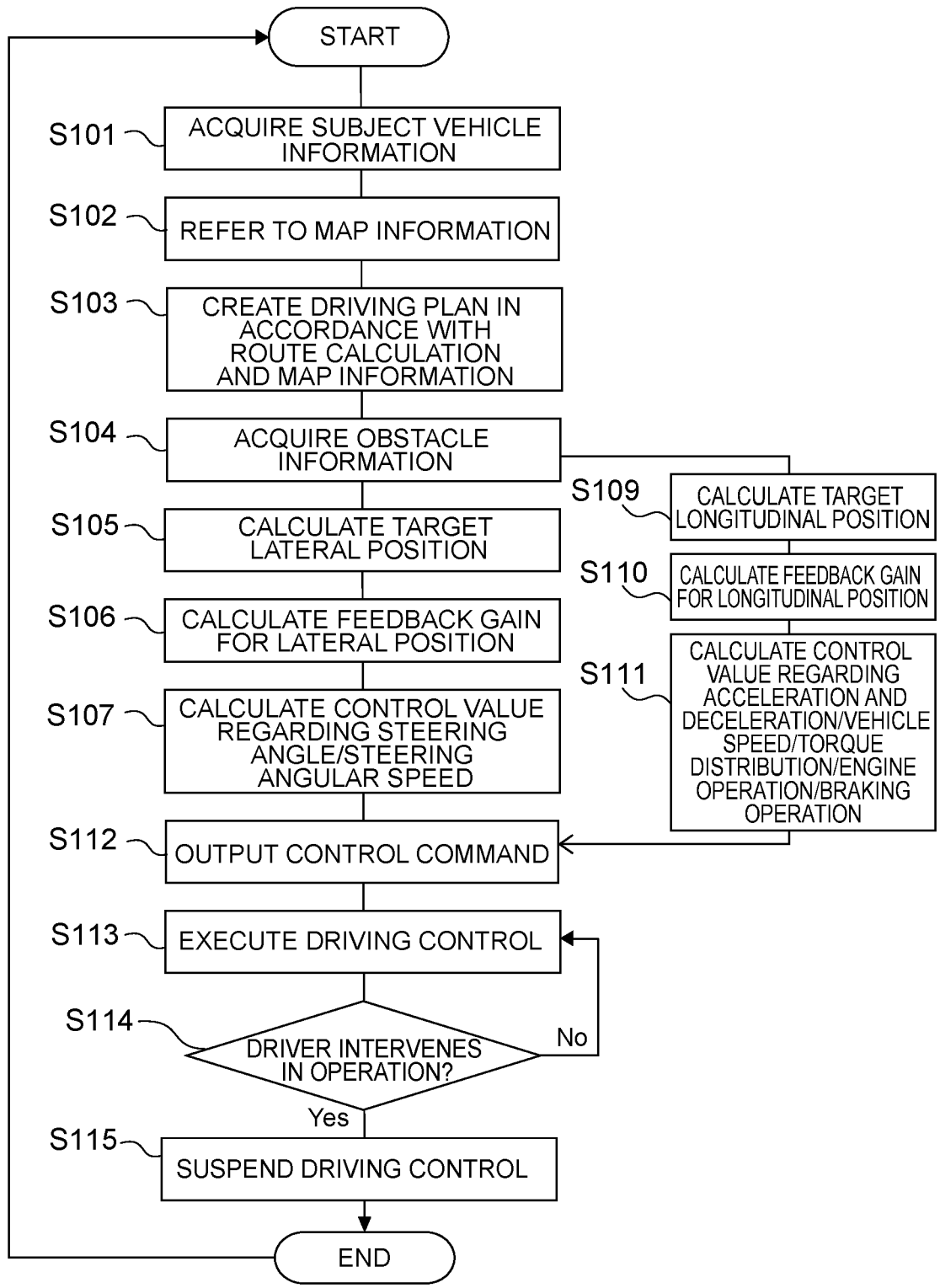
FIG. 5 is a flowchart illustrating a driving control procedure according to one or more embodiments of the present invention.
Figure 6:
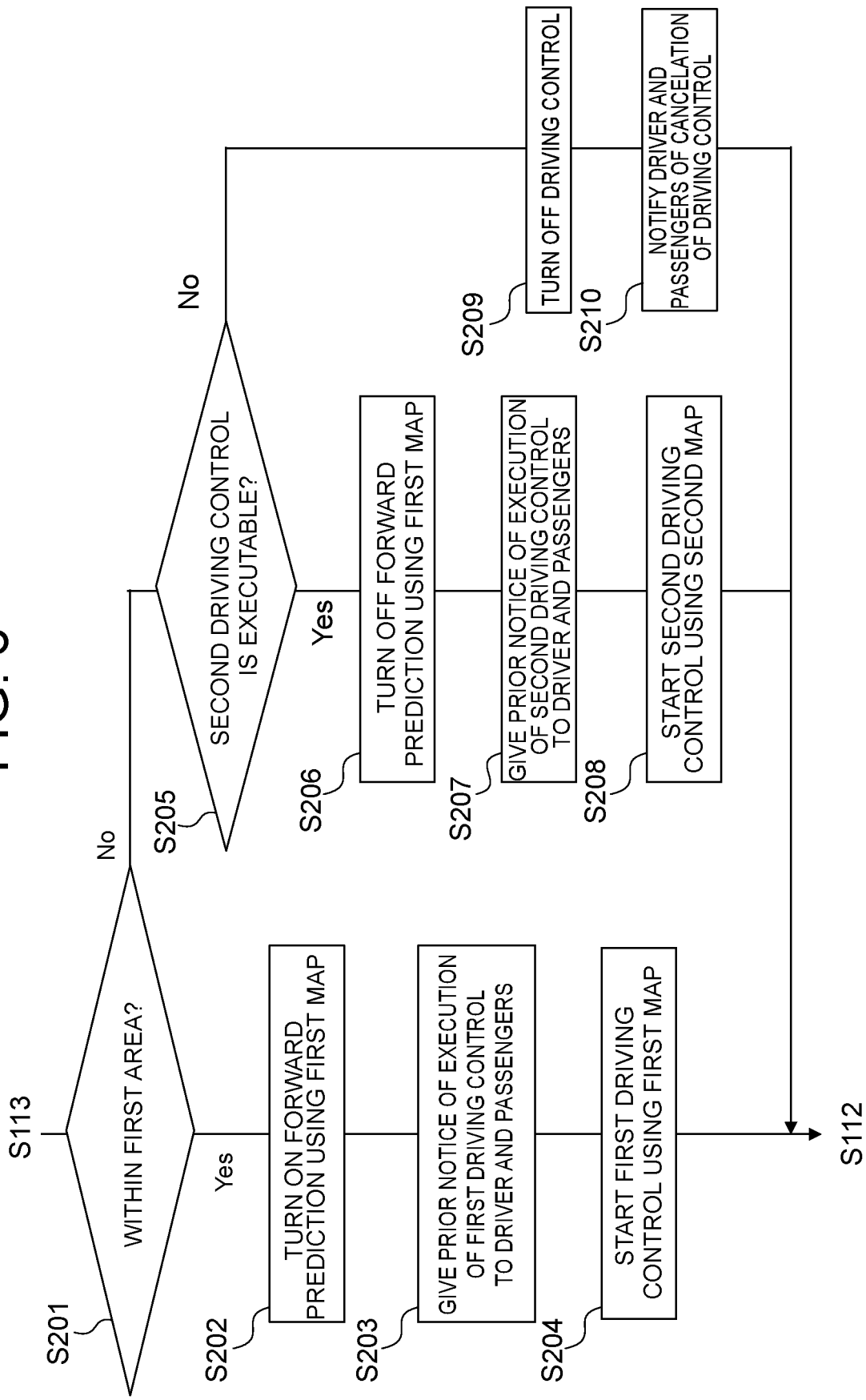
FIG. 6 is a chart for describing a switching process of driving control according to one or more embodiments of the present invention.

FIG. 6 is a chart for describing the method of executing the driving plan of step S113 illustrated in FIG. 5.

In step S201, the control device 10 determines whether or not the vicinity of the subject vehicle is within the first area of the first map MP1. When a determination is made that the vicinity of the subject vehicle is within the first area, the process proceeds to step S202, in which the forward prediction function is activated using the first map MP1. The forward prediction function is executed using the lane identification information of the first map MP1. In step S203, the control device 10 gives prior notice of execution of the first driving control to the driver and passengers. In step S204, the control device 10 executes the first driving control using the first map.

When a determination is made in step S201 that the vicinity of the subject vehicle is not within the first area of the first map MP1, the process proceeds to step S205. In step S205, a determination is made as to whether the second driving control can be executed. Whether the second driving control can be executed is determined with criteria that the second map MP2 is available, the road curvature is less than a predetermined value, the speed of surrounding another vehicle is less than a predetermined value, and/or the distance to another vehicle is a predetermined value or more. It may also be determined on the basis of whether or not the lane detection accuracy necessary for the lane-keeping traveling satisfies a predetermined degree of reliability. Step S205 is followed by step S206, in which the forward prediction function using the first map MP1 is canceled. In step S207, the control device 10 gives prior notice of execution of the second driving control to the driver and passengers. In step S208, the control device 10 executes the second driving control using the second map.

When a determination is made in step S205 that the second driving control cannot be executed, cancellation of the driving control function is determined in step S209, and the driver and passengers are notified of this fact in step S210.

Figure 7:
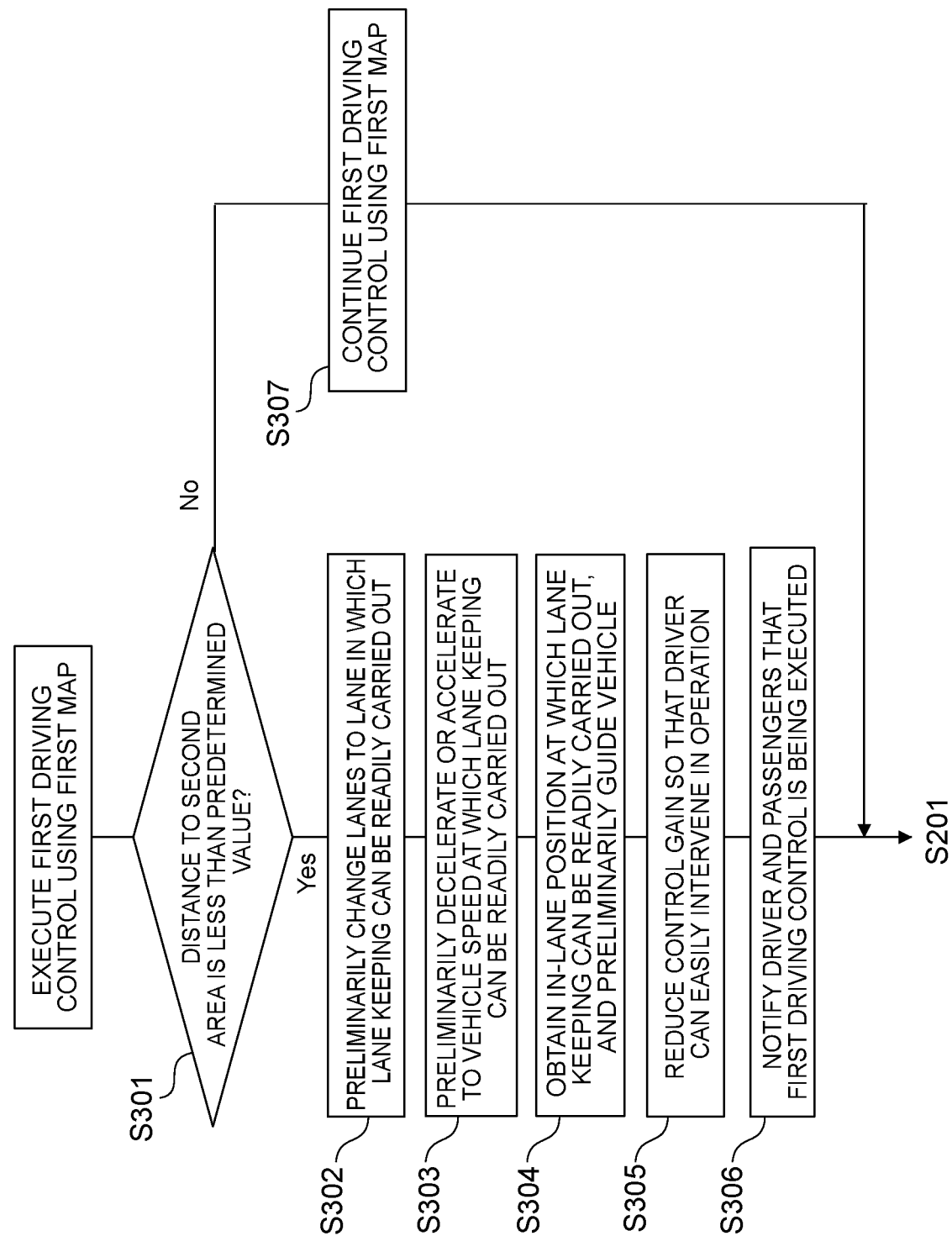
FIG. 7 is a chart for describing a switching preparation process of driving control according to one or more embodiments of the present invention.
Figure 8:
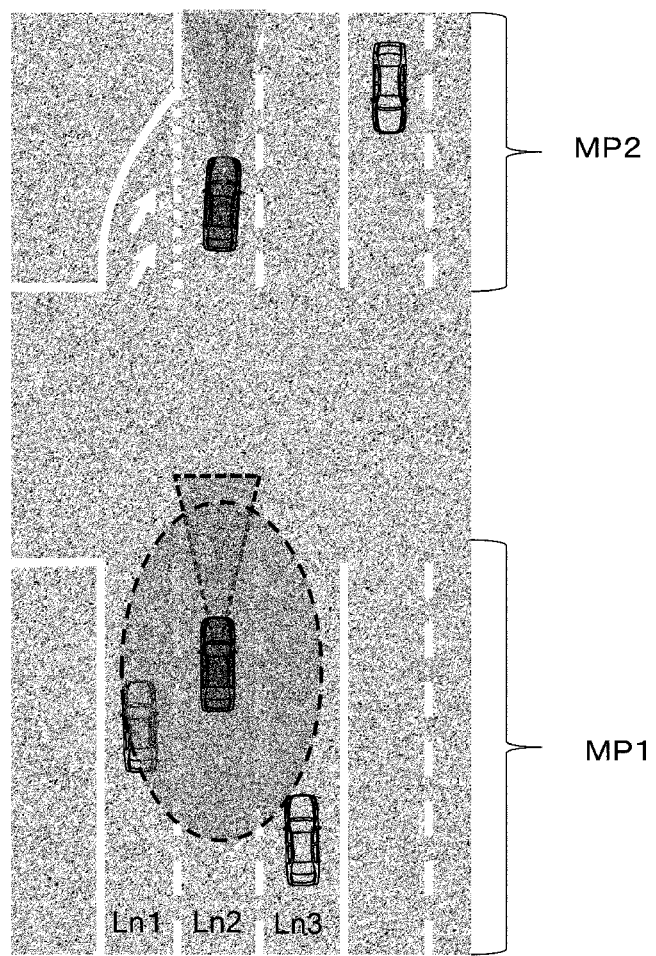
FIG. 8 is a diagram for describing the switching preparation process of driving control according to one or more embodiments of the present invention.

FIGS. 7 and 8 are a chart and a diagram for describing the operation at the time of switching from the first driving control to the second driving control.

FIG. 7 illustrates an example of the process of step S208 illustrated in FIG. 6.

It is assumed that the first driving control (high-level autonomous driving) using the first map MP1 is currently being executed. In step S301, the control device 10 determines whether or not the distance to the second area is less than a predetermined value. The control device 10 monitors the approach to the boundary point between the first area and the second area. When the distance to the second area is not less than the predetermined value, the process proceeds to step S307 to continue the first driving control.

In step S302, the control device 10 prepares for the lane-keeping driving control (second driving control) performed in the second area in accordance with the driving plan and preliminarily moves the vehicle to a lane in which the lane keeping can be readily carried out. The lane in which the lane keeping can be readily carried out refers to a centerline-side lane in which the vehicle speed of traveling vehicles is stable due to absence of merging/branch points.

Step S302 is followed by step S303, in which the control device 10 decelerates or accelerates the vehicle to a vehicle speed (target value) that allows the lane keeping to be readily carried out. The target value is set on the basis of the average speed for the travel lane. In step S304, the control device 10 obtains an in-lane position at which the lane keeping can be readily performed, and guides the vehicle. The position at which the lane keeping can be readily performed refers to a position within the lane central area. It is possible to respond to the adjustment of the lateral position even if another vehicle approaches after execution of the driving control. In step S305, the control device 10 lowers the control gain so that the operation input from the driver is not refused. This allows the driver to easily intervene in the operation at the time of switching of the driving control in which a change in the situation is predicted. In step S306, the control device 10 notifies the driver and passengers via the output devices 30 and 110 that the first driving control is being executed. This can reassure the driver and passengers by notifying them that some change occurs in the behavior of the vehicle, but the first driving control is being executed. In addition or alternatively, the control device 10 may give prior notice that the first driving control will be switched to the second driving control.

The driving control apparatus 100 according to one or more embodiments of the present invention is configured and operates as the above and therefore has the following effects.

(1) The driving control method according to one or more embodiments of the present invention includes, when traveling along the first route included in the route and belonging to the first map MP1, setting the first driving control, while when traveling along the second route included in the route and belonging to the second map MP2, setting the second driving control with a lower level of the autonomous driving than that of the first driving control, and creating a driving plan for the vehicle to travel to the destination with the contents of the set driving control.

When using the first map MP1, the driving control can be executed, including the lane change driving with a high level of the autonomous driving, but when using the second map MP2, the lane change driving cannot be executed. If no action takes place, the autonomous driving will be stopped just at the moment of entering the second area even though the autonomous driving has been executed in the first route within the first area. In the driving control method according to one or more embodiments of the present invention, when entering the second area from the first area, the autonomous driving level of the driving control is lowered to continue the driving control. The vehicle is controlled to travel along the first route within the first area by the autonomous driving which includes a lane change, and controlled to travel along the second route within the second area by the lane-keeping driving control. Thus, the driving control to be switched can be preliminarily defined thereby to prevent the driving control from suddenly stopping. The autonomous driving level may be lowered, but the driving control is continued, so that the burden on the driver and passengers can be alleviated.

(2) In the driving control method according to one or more embodiments of the present invention, the first driving control performed using the first map MP1 includes the lane change driving control by the autonomous driving which uses a lane prediction result in the traveling direction of the vehicle, while the second driving control does not include the lane change driving control. The first map MP1 and the contents of the first driving control are associated with each other and the second map MP2 and the contents of the second driving control are associated with each other; therefore, the driving control can be carried out with different levels of the autonomous driving in accordance with the change of the map to be referred to. When the first map MP1 cannot be used, the second driving control (lane-keeping driving control) can be continued using the second map MP2 even at a low level of the autonomous driving.

(3) The driving control method according to one or more embodiments of the present invention includes using the output devices 30 and 110 to present the driving plan to the driver and passengers of the vehicle before starting execution of the driving plan. The driving plan includes a control change point at which the first driving control and the second driving control are switched. This allows the driver and passengers to confirm the switching point of the autonomous driving control in the driving plan before starting the driving. Thus, the driver and passengers preliminarily confirm the point at which the initiative of driving is assigned, and the driving plan can thereby be smoothly executed.

(4) The driving control method according to one or more embodiments of the present invention includes presenting a control change point to the driver and passengers of the vehicle when passing through a point before the control change point by a predetermined distance. The control change point is a point at which the first driving control and the second driving control are switched. This allows the driver and passengers to confirm the switching point of the autonomous driving control in the driving plan before the switching point. Thus, the driving plan can be smoothly executed because the confirmation can be made on the upstream side of the point at which the initiative of driving is assigned.

(5) In the driving control method according to one or more embodiments of the present invention, the second driving control includes assists on the driving operation performed by the driver. The assists on driving by the driver include an assist on the steering operation, an assist on the accelerator operation, and an assist on the brake operation. In a scene in which the first driving control cannot be performed, the second driving control is performed. During this operation, the driver's load can be reduced because the driving operation by the driver is assisted.

(6) The driving control method according to one or more embodiments of the present invention includes creating the driving plan on the upstream side of the control change point at which the first driving control and the second driving control are switched. The driving plan includes the driving control for moving the vehicle to a centerline-side lane. The centerline-side lane refers to a lane on the centerline side, that is, a lane on the oncoming lane side. In a road including a plurality of lanes, it is highly possible that merging/branch into/from another lane takes place on the right or left end side (opposite side to the centerline side) of a road. It is not preferred to switch the driving control in a lane in which change in the traffic flow is likely to occur. The centerline-side lane may often be designated as an overtaking lane or a high-speed lane, in which disturbance in the traffic flow is small. In such a lane, the inter-vehicle distance tends to be set longer and, therefore, the influence due to switching of the driving control is also small. On the other hand, in a lane on the right or left end side, a number of vehicles are traveling toward a branch or turning to the right or left and some vehicles may be parked on the road shoulder, so that the traveling speed may be low and the inter-vehicle distance tends to be short. The influence due to switching of the driving control may therefore be large. Accordingly, in the driving control method according to one or more embodiments of the present invention, in preparation for switching of the driving control, the vehicle is controlled to preliminarily move to the centerline-side lane, in which change in the traffic flow is less likely to occur, on the upstream side of the driving control switching point. This can suppress the influence on the vehicle due to switching of the driving control. As a result, a change in the behavior of the vehicle is less likely to occur when switching the driving control.

(7) The driving control method according to one or more embodiments of the present invention includes creating the driving plan including the driving control to move the vehicle to the central area of a lane when traveling through the control change point at which the first driving control and the second driving control are switched. By moving the vehicle to the center of the lane before switching the driving control, it is possible to readily respond to any change in the behavior of the vehicle. This can suppress the influence on the vehicle due to switching of the driving control and prepare for the behavior change.

(8) The driving control method according to one or more embodiments of the present invention includes creating the driving plan including the driving control to set a speed of the vehicle to a target value when traveling through the control change point at which the first driving control and the second driving control are switched. When switching the driving control, it is preferred that the acceleration and deceleration do not affect the traffic flow. It is also preferred to set a target value on the basis of the speed for the lane, in which the vehicle travels when switching the driving control, and to set the speed of the vehicle to the target value. This can suppress the behavior change of the vehicle due to switching of the driving control and prevent the influence on the driving of another vehicle.

(9) The driving control method according to one or more embodiments of the present invention includes creating the driving plan including the driving control to make an amount of change in the behavior of the vehicle less than a predetermined value when traveling through the control change point at which the first driving control and the second driving control are switched. Even if a change occurs in the vehicle behavior when switching between the first driving control and the second driving control, the behavior change is made smooth. This can make smooth the vehicle behavior due to switching of the driving control and prevent the influence on the driving of another vehicle.

(10) The driving control method according to one or more embodiments of the present invention includes creating the driving plan including the driving control to lower a control gain of the vehicle when traveling through the control change point at which the first driving control and the second driving control are switched. When the driving control switches, the control gain is lowered to allow the driver's intervention in the operation to be readily accepted, so that even when the driver suddenly steers the steering wheel, the driver's operation command can be executed without conflicting with the driving control which is being executed (without being refused).

(11) The driving control method according to one or more embodiments of the present invention includes creating the driving plan such that switching between the first driving control and the second driving control is executed in a lane having a curvature less than a predetermined curvature. By performing the switching of the driving control in an area (route) in which lateral acceleration or lateral jerk is less likely to occur, it is possible to suppress the change in the vehicle behavior due to switching of the driving control.

(12) The driving control method according to one or more embodiments of the present invention includes creating the driving plan such that switching between the first driving control and the second driving control is executed in a lane in which the number of vehicles present within a predetermined distance is less than a predetermined value. When the number of vehicles present within a predetermined distance is large, it is highly possible that other vehicles are present in the vicinity. In this case, it may be necessary to create the driving plan for the vehicle with consideration for the movement of other vehicles in the vicinity, and calculation of the driving plan will be complicated. By executing the switching of the driving control in a lane in which the number of other vehicles is small, it is possible to execute the control which gives priority to the movement of the subject vehicle with consideration only for the behavior of the subject vehicle.

(13) When the driving control method according to one or more embodiments of the present invention is executed by the control device 10, the driving control apparatus 100 exerts the same action and the same effects as those of the above driving control method.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1 Driving control system
100 Driving control apparatus
10 Control device
11 CPU
12 ROM
300 Map information
MP1 First map
MP2 Second map
13 RAM
20 Communication device
30 Output device
31 Display
32 Speaker
200 Onboard apparatus
40 Communication device
50 Detection device
51 Camera
52 Radar device
60 Sensor
61 Steering angle sensor
62 Vehicle speed sensor
70 Vehicle controller
80 Driving device
81 Braking device
90 Steering device
110 Output device
111 Display
112 Speaker
120 Navigation device
121 Position detection device
123 Map information
MP1 First map
MP2 Second map

The invention claimed is:

1. A driving control method comprising:
acquiring a destination of a vehicle;
referring to map information having a first map that includes lane identification information of a travel lane of a road comprising one or more lanes in a traveling direction, wherein the lane identification information enables prediction of a lane in a direction of travel in a future, and a second map that does not include the lane identification information of the travel lane;
calculating a route from a current position of the vehicle to the destination;
before traveling in areas of the route belonging to the first map and the second map, creating a driving plan for the vehicle to travel autonomously along the route with a first autonomous driving control planned to be used in the area of the route belonging to the first map and a second autonomous driving control planned to be used in the area of the route belonging to the second map;
transmitting the driving plan to a controller of the vehicle;
driving the vehicle so as to transition from the area of the route belonging to the first map to the area of the route belonging to the second map in accordance with the driving plan; and
switching automatically from the first automatic driving control to the second automatic driving control when driving the vehicle through a control change point that transitions from the area of the route belonging to the first map to the area of the route belonging to the second map,
wherein the first autonomous driving control includes lane-keeping driving control by autonomous driving and lane change driving control by the autonomous driving, wherein the prediction of the lane in the direction of travel of the vehicle based on the lane identification information of the travel lane is used, and
wherein the second autonomous driving control does not include the lane change driving control but includes the lane-keeping driving control by the autonomous driving.

2. The driving control method according to claim 1, further comprising:
presenting the driving plan to a driver or a passenger of the vehicle before executing the driving plan, the driving plan including the control change point at which the first autonomous driving control and the second autonomous driving control are switched automatically.

3. The driving control method according to claim 1, further comprising:
presenting the control change point to a driver or a passenger of the vehicle when passing through a point before the control change point by a predetermined distance, the control change point being a point at which the first autonomous driving control and the second autonomous driving control are switched automatically.

4. The driving control method according to claim 1, wherein the second autonomous driving control includes an assist on the driving by a driver.

5. The driving control method according to claim 1, wherein creating the driving plan further includes driving control to move the vehicle to a centerline-side lane on an upstream side of the control change point at which the first autonomous driving control and the second autonomous driving control are switched automatically.

6. The driving control method according to claim 5, wherein creating the driving plan further includes driving control to move the vehicle to a central area of a lane when traveling through the control change point at which the first autonomous driving control and the second autonomous driving control are switched automatically.

7. The driving control method according to claim 1, wherein creating the driving plan further includes driving control to set a speed of the vehicle to a target value when traveling through the control change point at which the first autonomous driving control and the second autonomous driving control are switched automatically.

8. The driving control method according to claim 1, wherein creating the driving plan further includes driving control to make an amount of change in behavior of the vehicle less than a predetermined value when traveling through the control change point at which the first autonomous driving control and the second autonomous driving control are switched automatically.

9. The driving control method according to claim 1, wherein creating the driving plan further includes driving control to reduce a control gain of the vehicle when traveling through the control change point at which the first autonomous driving control and the second autonomous driving control are switched automatically.

10. The driving control method according to claim 1, wherein switching between the first autonomous driving control and the second autonomous driving control is executed in a lane having a curvature less than a predetermined curvature.

11. The driving control method according to claim 1, wherein switching between the first autonomous driving control and the second autonomous driving control is executed in a lane in which a number of other vehicles present within a predetermined distance is less than a predetermined value.

12. The driving control method according to claim 1, further comprising:
    before the driving plan is executed, presenting the driving plan to an occupant of the vehicle.

13. The driving control method according to claim 12, wherein the driving plan includes the control change point for switching automatically between the first autonomous driving control and the second autonomous driving control.

14. A driving control apparatus comprising a control device configured to create a driving plan and cause a controller of a vehicle to execute the driving plan, the control device being further configured to:
    acquire a destination of the vehicle;
    refer to map information having a first map that includes lane identification information of a travel lane of a road comprising one or more lanes in a traveling direction, wherein the lane identification information enables prediction of a lane in a traveling direction in a future, and a second map that does not include the lane identification information of the travel lane;
    calculate a route from a current position of the vehicle to the destination;
    before travel occurs in areas of the route belonging to the first map and the second map, create the driving plan for the vehicle to travel autonomously along the route with a first autonomous driving control is planned to be used in the area of the route belonging to the first map and a second autonomous driving control is planned to be used in the area of the route belonging to the second map;
    transmit the driving plan to the controller of the vehicle;
    drive the vehicle so as to transition from the area of the route belonging to the first map to the area of the route belonging to the second map in accordance with the driving plan; and
    switch automatically from the first automatic driving control to the second automatic driving control when driving the vehicle through a control change point that transitions from the area of the route belonging to the first map to the area of the route belonging to the second map,
    wherein the first autonomous driving control includes lane-keeping driving control by the autonomous driving and lane change driving control by the autonomous driving, wherein the prediction of the lane in the traveling direction of the vehicle based on the lane identification information of the travel lane is used, and
    wherein the second autonomous driving control does not include the lane change driving control but includes the lane-keeping driving control by the autonomous driving.

* * * * *